(12) United States Patent
Kim (10) Patent No.: US 7,664,836 B2
(45) Date of Patent: Feb. 16, 2010

(54) DEVICE AND METHOD FOR BOOTING AN OPERATION SYSTEM FOR A COMPUTER FROM A PASSIVE DIRECTLY ATTACHED NETWORK DEVICE

(75) Inventor: Han-Gyoo Kim, Irvine, CA (US)

(73) Assignee: Zhe Khi Pak, Moscow (RU)

( * ) Notice: Subject to any disclaimer, the term of this patent is extended or adjusted under 35 U.S.C. 154(b) by 1059 days.

(21) Appl. No.: 11/061,760

(22) Filed: Feb. 17, 2005

(65) Prior Publication Data

US 2005/0193189 A1    Sep. 1, 2005

Related U.S. Application Data (60) Provisional application No. 60/545,040, filed on Feb. 17, 2004.

(51) Int. Cl.
*G06F 15/16* (2006.01)

(52) U.S. Cl. .......................... 709/222; 709/223; 713/2

(58) Field of Classification Search .............. 709/220, 709/222–224, 226, 201–202; 713/1–2
See application file for complete search history.

(56) References Cited

U.S. PATENT DOCUMENTS

| | | |
|---|---|---|
| 5,329,619 A | 7/1994 | Page et al. |
| 5,426,427 A | 6/1995 | Chinnock et al. |
| 5,463,772 A | 10/1995 | Thompson et al. |
| 5,513,314 A | 4/1996 | Kandasamy et al. |
| 5,524,247 A | 6/1996 | Mizuno |
| 5,566,331 A | 10/1996 | Irwin, Jr. et al. |
| 5,721,818 A | 2/1998 | Hanif et al. |
| 5,774,660 A | 6/1998 | Brendel et al. |

(Continued)

FOREIGN PATENT DOCUMENTS

DE    19610840    9/1997

(Continued)

OTHER PUBLICATIONS

L.C. Benschop, L.C. "Linux Boot Loaders Compared", May 29, 2003, printed from www.xs4all.nl, 32 pages.*

(Continued)

*Primary Examiner*—David Lazaro
(74) *Attorney, Agent, or Firm*—Rothwell, Figg, Ernst & Manbeck, P.C.

(57) ABSTRACT

System, device, method, computer, computer program and computer program product for computer booting devices not coupled to an internal local bus of the computer to be booted. Boot device may be network-attached device directly coupled to computer over network and not through another computer or server process. Method for redirecting booting process to look away from storage devices coupled to internal computer bus, and to look for external devices on network. Method of booting computer with operating system from storage device including executing a boot block loader program in the processor and memory of computer to be booted that before loading an operating system, loads device driver for accessing storage device; loading the operating system from storage device that is not directly coupled to internal local bus of computer using the device driver, to processor accessible memory; and booting computer from loaded operating system. Computer program and computer program product.

38 Claims, 9 Drawing Sheets

U.S. PATENT DOCUMENTS

| | | |
|---|---|---|
| 5,781,550 A | 7/1998 | Templin et al. |
| 5,812,930 A | 9/1998 | Zavrel |
| 5,838,916 A | 11/1998 | Domenikos et al. |
| 5,889,942 A | 3/1999 | Orenshteyn |
| 5,987,523 A | 11/1999 | Hind et al. |
| 5,987,627 A | 11/1999 | Rawlings, III |
| 5,999,808 A | 12/1999 | LaDue |
| 6,047,307 A | 4/2000 | Radko |
| 6,085,234 A | 7/2000 | Pitts et al. |
| 6,128,644 A | 10/2000 | Nozaki |
| 6,128,690 A | 10/2000 | Purcell et al. |
| 6,167,490 A | 12/2000 | Levy et al. |
| 6,175,869 B1 | 1/2001 | Ahuja et al. |
| 6,216,202 B1 | 4/2001 | D'Errico |
| 6,314,465 B1 | 11/2001 | Paul et al. |
| 6,317,775 B1 | 11/2001 | Coile et al. |
| 6,327,594 B1 | 12/2001 | Van Huben et al. |
| 6,345,300 B1 | 2/2002 | Bakshi et al. |
| 6,347,095 B1 | 2/2002 | Tang et al. |
| 6,356,915 B1 | 3/2002 | Chtchetkine et al. |
| 6,360,265 B1 | 3/2002 | Falck et al. |
| 6,366,988 B1 | 4/2002 | Skiba et al. |
| 6,389,432 B1 | 5/2002 | Pothapragada et al. |
| 6,393,569 B1 | 5/2002 | Orenshteyn |
| 6,404,766 B1 | 6/2002 | Kitai et al. |
| 6,421,753 B1 | 7/2002 | Hoese et al. |
| 6,449,647 B1 | 9/2002 | Colby et al. |
| 6,470,389 B1 | 10/2002 | Chung et al. |
| 0,018,403 A1 | 1/2003 | Braun et al. |
| 6,510,164 B1 | 1/2003 | Ramaswamy et al. |
| 6,518,965 B2 | 2/2003 | Dye et al. |
| 6,523,066 B1 | 2/2003 | Montroy et al. |
| 6,529,996 B1 | 3/2003 | Nguyen et al. |
| 6,539,446 B1 | 3/2003 | Chan |
| 6,578,111 B1 | 6/2003 | Damron et al. |
| 6,594,677 B2 | 7/2003 | Davis et al. |
| 6,598,068 B1 | 7/2003 | Clark |
| 6,609,167 B1 | 8/2003 | Bastiani et al. |
| 6,647,016 B1 | 11/2003 | Isoda et al. |
| 0,225,834 A1 | 12/2003 | Lee et al. |
| 6,732,104 B1 | 5/2004 | Weber |
| 0,117,813 A1 | 6/2004 | Karaoguz et al. |
| 6,760,783 B1 | 7/2004 | Berry |
| 6,807,581 B1 | 10/2004 | Starr et al. |
| 6,823,458 B1 | 11/2004 | Lee et al. |
| 6,834,326 B1 | 12/2004 | Wang et al. |
| 0,042,591 A1 | 2/2005 | Bloom et al. |
| 0,110,768 A1 | 5/2005 | Marriott et al. |
| 6,894,981 B1 | 5/2005 | Coile et al. |
| 6,941,576 B2 | 9/2005 | Amit |
| 0,004,935 A1 | 1/2006 | Seto et al. |
| 7,010,303 B2 | 3/2006 | Lewis et al. |
| 7,069,312 B2 | 6/2006 | Kostic et al. |
| 7,069,350 B2 | 6/2006 | Fujita et al. |
| 7,076,690 B1 | 7/2006 | Todd et al. |
| 7,124,128 B2 | 10/2006 | Springer et al. |
| 7,251,704 B2 | 7/2007 | Solomon et al. |
| 7,254,578 B2 | 8/2007 | Devarakonda et al. |
| 7,277,955 B2 | 10/2007 | Elliott |
| 7,376,133 B2 | 5/2008 | Gettala et al. |
| 7,383,229 B2 | 6/2008 | Jacoby |
| 2002/0069245 A1 | 6/2002 | Kim |
| 2002/0078290 A1* | 6/2002 | Derrico et al. ............... 710/302 |
| 2003/0014569 A1 | 1/2003 | Kim |
| 2003/0028614 A1 | 2/2003 | Jeon |
| 2003/0172149 A1 | 9/2003 | Edsall et al. |
| 2004/0068563 A1 | 4/2004 | Ahuja et al. |
| 2004/0220933 A1 | 11/2004 | Walker |
| 2005/0149682 A1 | 7/2005 | Kim |
| 2005/0193017 A1 | 9/2005 | Kim |
| 2006/0010287 A1 | 1/2006 | Kim |
| 2006/0045130 A1 | 3/2006 | Kim |
| 2006/0067356 A1 | 3/2006 | Kim |
| 2006/0069884 A1 | 3/2006 | Kim |
| 2006/0155805 A1 | 7/2006 | Kim |
| 2007/0008988 A1 | 1/2007 | Kim et al. |

FOREIGN PATENT DOCUMENTS

| | | |
|---|---|---|
| DE | 10038142 | 2/2001 |
| JP | 101113469 | 5/1998 |
| JP | 10271562 | 10/1998 |
| JP | 11007404 | 1/1999 |
| JP | 11114224 | 4/1999 |
| KE | 2000072493 | 12/2000 |
| KR | 2001088528 | 9/2001 |
| WO | WO99/03297 | 7/1999 |
| WO | WO00/29529 | 5/2000 |

OTHER PUBLICATIONS

Blunden et al., "Storage Network Virtualization: What's it all about?", ibm.com/redbooks, XP-002286341, pp. 1-110, Dec. 2000.

Klein, Yaron, "Storage Virtualization with iSCSI Protocol", Internet Draft, XP-015030964, pp. 1-15, Nov. 2, 2000.

Schulz, Greg, "SAN and NAS; Complementary Technologies", http://www.mti.com/white_papers/WP20002.pdf, XP-002201566, pp. 1-7, May 1, 2000.

Japanese Office Action, App. No. 555298/2002, Jan. 9, 2007.

Japanese Office Action, App. No. 513300/2003, Feb. 6, 2007.

* cited by examiner

DEVICE AND METHOD FOR BOOTING AN OPERATION SYSTEM FOR A COMPUTER FROM A PASSIVE DIRECTLY ATTACHED NETWORK DEVICE

RELATED APPLICATIONS

This patent application claims the benefit of priority under 35 U.S.C. §119 and/or 35 U.S.C. §120 to U.S. Provisional Patent Application Ser. No. 60/545,040 filed 17 Feb. 2004 entitled Bootstrapping from Network Directly Attached Devices, and which is hereby incorporated by reference.

U.S. patent application Ser. No. 09/974,082, entitled "Disk System Adapted to Be Directly Attached to Network" filed Oct. 9, 2001; U.S. Provisional Patent Application Ser. No. 60/603,917, entitled "A Network Direct Attached Storage Suitable for Home Network," filed Aug. 23, 2004; U.S. Non-provisional patent application Ser. No. 10/195,817, entitled "Scheme for Dynamically Connecting I/O Devices Through Network" and filed on Jul. 15, 2002; and U.S. Provisional Application Ser. No. 60/590,722, entitled "Low Level Communication Layers and Device Employing Same" and filed on Jul. 22, 2004; all of which are related applications that are hereby incorporated by reference as if fully set forth herein.

FIELD OF THE INVENTION

This invention pertains generally to computer system booting devices and methods of booting from a device that is attached directly to the network and not through another computer or server process and more specifically to method and bootstrapping device that is a hard disk drive or other storage device that is directly attached to the network and not through another computer or server-client process and yet is accessible through the network by a host computer attempting to boot.

BACKGROUND

When a computer is powered on, the binary image of its operating system must first be loaded into memory from a storage device in order for the operating system to be set running and controlling the whole computer system. In order to load the operating system (OS), booting or bootstrapping mechanisms are conventionally used to initiate or start the computer system running.

Many computer systems automatically start a program that resides in nonvolatile storage devices such as ROM, or flash memory. Such a program is generally a small ROM monitor that can do simple things like reading and writing memory. Sometimes this small program is referred to as the system basic input-output-system or BIOS, although a BIOS program is a more specific case of such ROM-based program. This ROM monitor program can also read into memory usually one specific block of data storage devices such as hard disk drive. Usually, the computers or other information appliances of a particular type store some device and/or address information in the ROM as a first place, or as ordered alternative places, to find more complex and lengthy programs or code so that multiple components of the system may be loaded. As the ROM monitor may generally not know exactly what device or what hard disk drive device or capacity will store other operating system or program components, certain conventions have been established so that at least certain standards exist in conventional systems and devices. This ROM monitor program is the hook needed to run the whole operating system in a computer. Usually, the ROM can be any types of non volatile memory such as flash memory.

Figure 1:
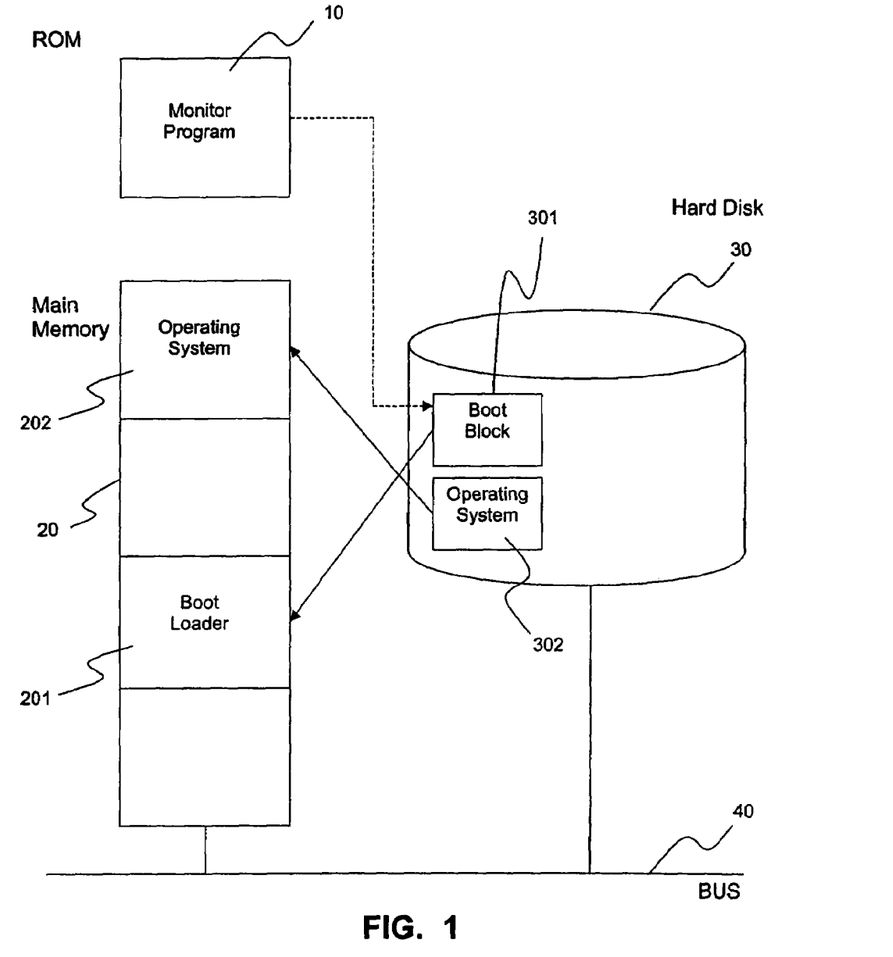
FIG. 1 is an illustration showing a typical bootstrapping procedure of a conventional computer system from an internal bus connected hard disk drive.

With reference to the illustration in FIG. 1, there is shown a typical approach to booting an operating system that is stored in or resides on a hard disk drive accessible over the system or other internal bus 40 of a host computer. First (Step 1), the monitor program in the ROM 10 reads the boot block 301 of the hard disk drive storage device 30 into the main memory 20 of the host computer, where the loading occurs at a specified location of the main memory 201. The boot block contains or includes a loader program. Next (Step 2), the monitor program transfers control to the loader program read in from the boot block (in Step 1). Then (Step 3), the boot block loader program finds and loads the operating system blocks 302 stored in the hard disk into the specified main memory location 202. Finally (Step 4), the loading of the operating system into the main memory is completed, and the loader program originally in the boot block but now executing from main memory transfers control to the operating system, and the operating system then starts running and controlling the host computer system. Other variants are known and those workers having ordinary skill in the art will appreciate the variations and additional details associated with conventional booting methods and device characteristics.

Figure 2:
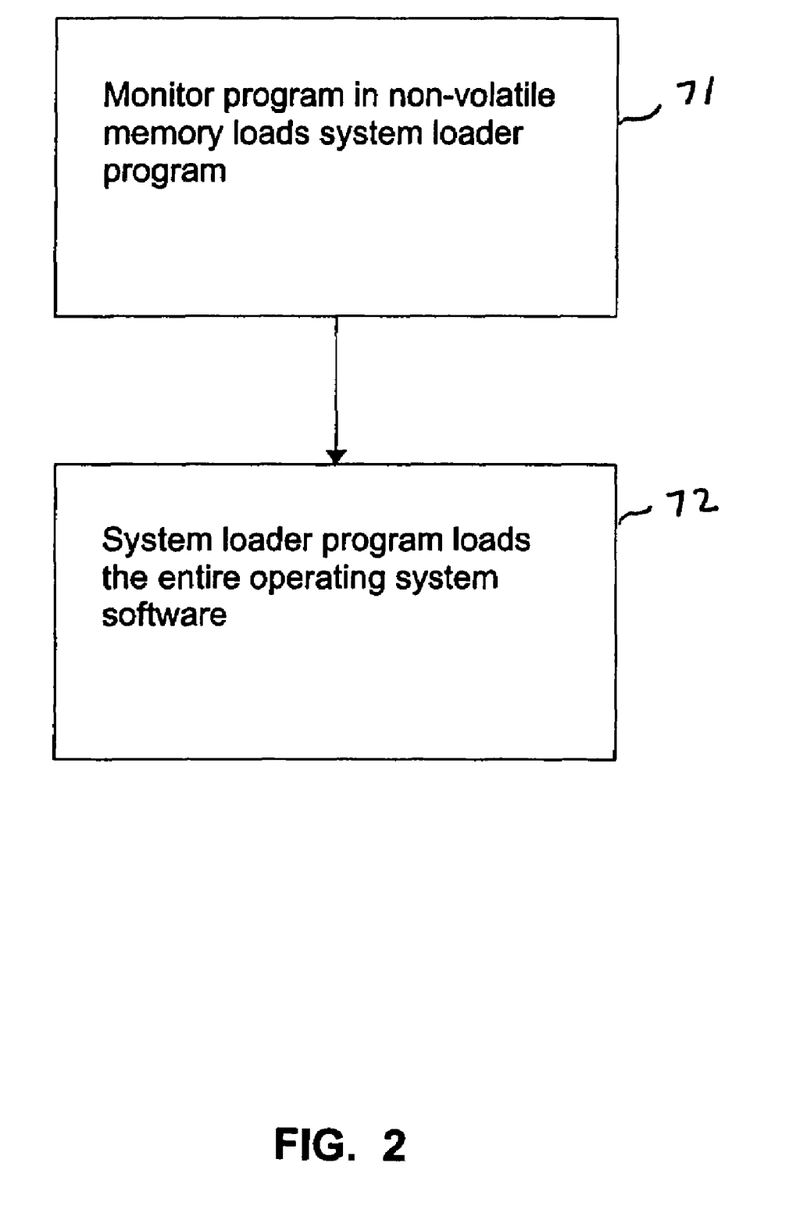
FIG. 2 is an illustration showing an exemplary and typical two-step computer bootstrap procedure of its operating system using monitor program and system boot loader program.

It is typical that computer system gets through several bootstrapping steps before finally bootstrapping its operating system software. For example, FIG. 2 shows the basic steps of a typical computer system bootstrapping its operating system. The monitor program stored and accessible from a non-volatile memory of the system (typically a motherboard resident read-only memory or ROM chip) loads a system boot loader program or code 71, and the system boot loader program or code, in turn, loads the actual operating system software 72 from an internal bus coupled storage device such as from an internal IDE bus coupled hard disk drive.

Figure 3:
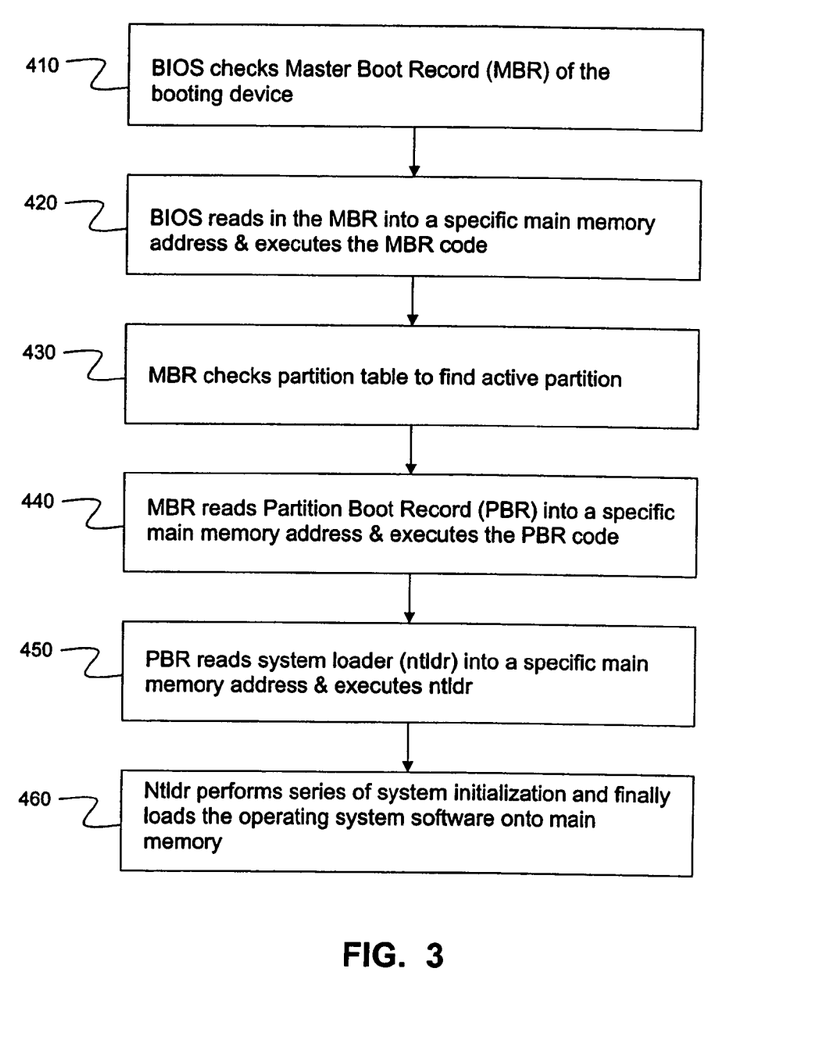
FIG. 3 is an illustration showing an exemplary high-level flow diagram of bootstrapping procedure.

FIG. 3 shows the simplified steps of a conventional bootstrapping from a hard disk drive of a PC with WINDOWS™ operating system from Microsoft Corp. of Redmond, Wash. (Alternative conventional systems and method may utilize UNIX or Linux operating systems or be Apple Computer systems operating system based.) The BIOS program of the computer checks Master Boot Record (MBR) of the booting device 410 and the BIOS reads in or loads the MBR (master boot record) of the hard disk drive into a specific main memory address of the main memory and executes the MBR 420. The MBR checks the partition table to find the active partition of the hard disk drive 430 and reads the PBR (partition boot record) into a specific main memory address of the main memory and executes the PBR 440. The PBR reads the system loader (such as "ntldr", the system boot loader of WINDOWS™ operating system) into a specific main memory address of the main memory and executes the system loader (such as "ntldr") 450. It is the boot loader, such as ntldr, that performs series of system initialization and finally loads the operating system into the main memory 460. During the system loading process, the boot loader reads a series of software modules including system data structures, files, device drivers, and DLL's from the booting device such as hard disk drive into its main memory.

Figure 4:
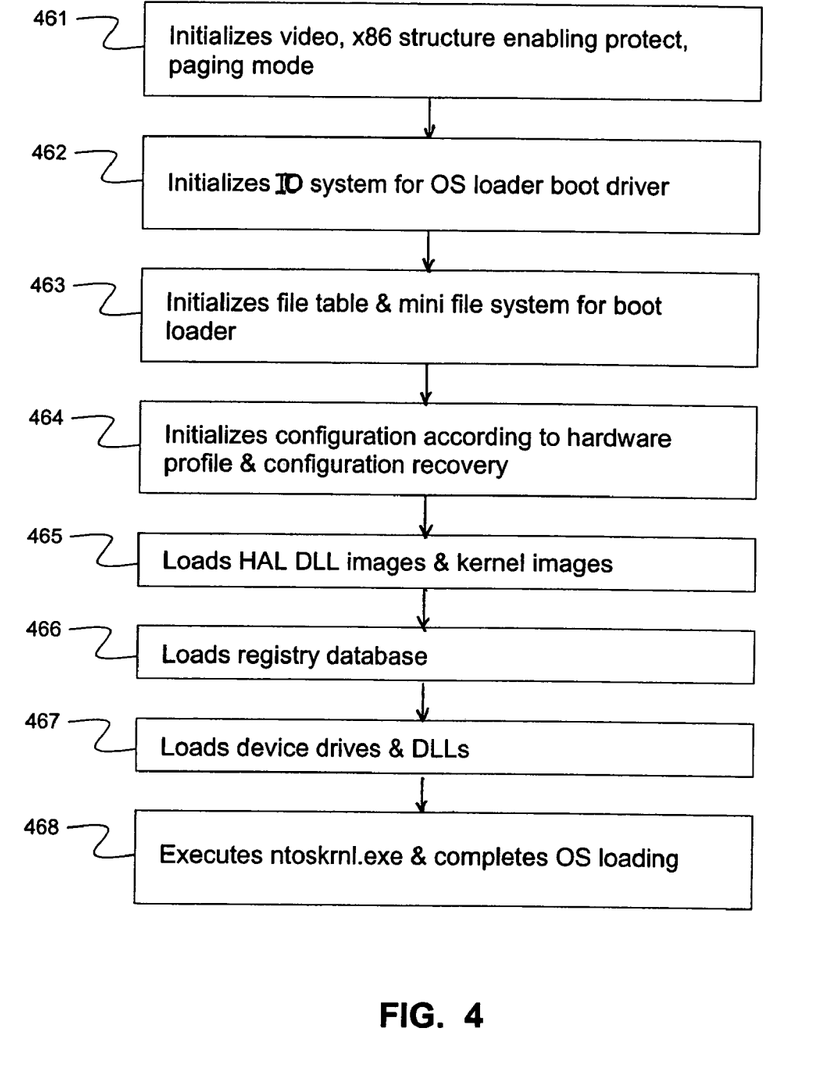
FIG. 4 is an illustration showing an exemplary flow diagram describing the processes of a typical system boot loader of a portion of the procedural steps in FIG. 3.

FIG. 4 shows the procedures that the conventional boot loader performs in a typical computer system. The boot loader initializes video system (such as for debugging) and initializes paging mode 461. Then it initializes the input/output (I/O) system and the operating system boot driver software needed for actual operating system loading 462. Once the system is initialized, the loader reads in the file table and possibly a mini file system for the boot loader 463; and performs series of system initializations according to the hardware profile and configuration recovery file 464; and loads all the DLL's, kernel images, registry database, and device drivers respectively 465, 466, 467 before it completes the loading of its operating system software 468, such as by executing "ntoskrnl.exe.

During the loading process, the loader uses the boot driver software in order to access the booting device for loading the necessary software modules and that the boot driver software is a simple device driver that facilitates the loader program to access the booting device during the booting process. Typically, the boot driver is a simplified SCSI device driver if the booting device is a hard disk drive.

While emphasis in the above description has been on hard disk drive stored operating systems, it will be appreciated that the operating system can reside in CD, DVD, flash memory, floppy diskette and other persistent storage media besides hard disk drives 30. These alternatives are particularly useful for new computers or when reloading of an operating system onto a replacement hard disk drive. One key feature of conventional booting devices and booting methods has been that no matter what the hardware boot device, the hardware devices that contain the operating system from which the operating system is loaded has been attached to an internal bus 40 of the computer system.

Conventional computer systems, including most notebook computers, still keep all the essential hardware components including hard disk from which the computer bootstraps (or "boots" for short) its operating system is not only collocated with the computer, but also housed within one enclosure, such as the housing of the computer whether a so called desktop or notebook type model.

In some circumstances, however, it may be desirable for the computer system to be constructed such a way that the system hard disk containing the operating system and even the computer user's own data is either not collocated or is kept physically separated from rest of the whole computer system for better portability, for security, or for other reasons. However, the conventional need to have the bootable device coupled to an internal bus that is usually a high-speed parallel type bus, such as the main system bus, or a high-speed IDE, EIDE, ATA, or other high-speed bus makes separation and detachment difficult and practically impossible. Especially if the computer system is designed and built to provide an internal bus configured bootable hard disk that contains operating system, then attempts at modification of the computer to separate the bootable hard disk drive (or other boot device) from the rest of the computer and still maintain an ability to boot from that separated hard disk drive, will be difficult at best and likely practically impossible.

Therefore there is a need to provide a computer system that is able to boot from a separate external boot device, such as a hard disk drive, that is not connected directly to an internal bus of the computer to be booted. It is also desirable to provide a simple bootable device that supports booting in this manner. It is also desirable to provide devices and methods for booting that are compatible with conventional computers and operating systems, such as for example personal computers (PC's) made by Compaq, Dell, Hewlett-Packard, Gateway, and Apple Computer and support any of the conventional or to be implemented Windows, Linux, Unix, Apple, or other operating systems. Advantageously, exiting or partially existing physical hardware components may also be utilized. Such backward compatibility in terms of hardware and software would permit wide spread adaptation over a large installed base of computers.

Figure 5:
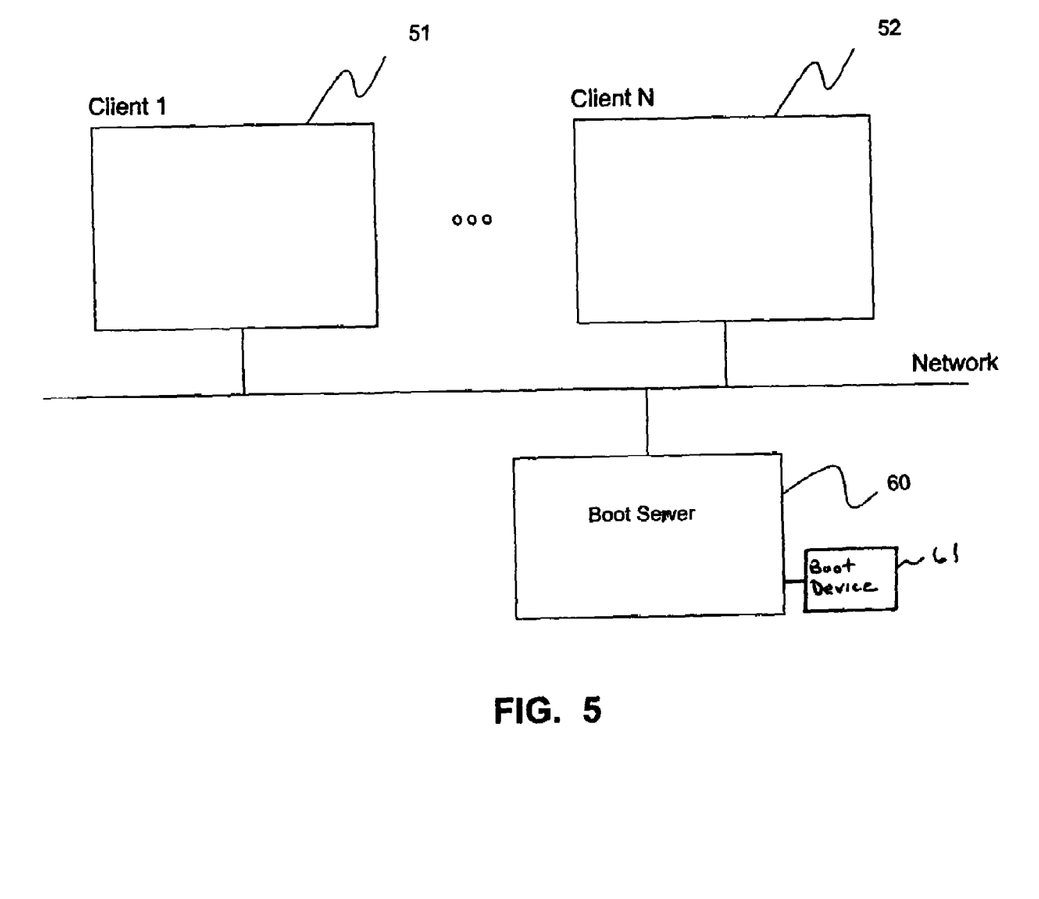
FIG. 5 is an illustration showing an exemplary computer network where client computers bootstrap from a storage device coupled to the network through a boot server computer.

Some computers including diskless computers bootstrap their operating systems from network servers over an internet or intranet connection. FIG. 5 shows an example of a network having a server and multiple clients. During the network-based booting process, the client computers 51, 52 send out packet(s) requesting files necessary for bootstrapping to the server computer 60, then the server computer 60 replies to the client computer 51, 52 with appropriate boot files from a disk 61 or other storage having boot files. However, it will be appreciated that the booting in this example from boot devices 61 or storage connected through the server computer (or server process executing on a computer) over the network is different from the booting from a storage device that is directly attached to the network without an interposed server computer having its own processor or CPU, memory, and executing operating system and application program. Bootstrapping a host computer system from the network server requires that the independent boot server computer system exist and such boot server computer is a computer separate and independent of the client computers that need to boot. The host computers must also have or execute a client process in order to communicate with the server. The need for server computer infrastructure and client processes running on the computer needing to boot increases the cost and complexity of network server based booting and by and large limits the applicability to corporate or large organization information technology systems or to some paid service that may permit an individual to maintain a copy of his/her operating system on a server and use it to boot in the event of a local boot drive failure or other corruption.

It will also be appreciated that external storage devices with USB, IEEE 1394, or other interface have been used, however, booting from these external devices is not a booting over a network.

Therefore, although there have been some attempts to provide a boot capability over a network from a remote hard disk drive storage device, such attempts have not been entirely successful in providing a inexpensive booting or bootstrapping device or method, or computer system that can bootstrap using such directly attached network storage devices that do not require or utilize an intervening server to access the directly attached storage device.

SUMMARY

System, device, method, computer program and computer program product for computer system booting devices and methods of booting from a device that is not coupled to an internal local bus of the computer to be booted. Boot device may be a network-attached device directly coupled to the computer over a network and not through another computer or server process.

Method for redirecting a booting process to look away from storage devices coupled to internal computer bus such as to a system on internal peripheral bus, and to look for external devices on a network such as on the Internet.

A method of booting a computer with an operating system from a storage device including executing a boot block loader program in the processor and memory of the computer to be booted that before loading an operating system, loads a device driver for accessing a storage device on which an operating system for the computer is stored; loading the operating system from the storage device that is not directly coupled to an internal local bus of the computer using the device driver, to the processor accessible memory; and then booting the computer from the loaded operating system.

A computer having: a processor and a random access memory coupled to the processor; and a non-volatile storage device storing at least one program, the at least one program controlling operation of a boot loader and boot device driver so that the computer can: (a) send commands and/or data to storage device through a network controller the boot device that stores additional boot or operating system code, and (b) receive the necessary additional boot code or commands and/or data from the boot device over the network.

Computer program, computer program product, and data structures associated with the methods and procedures of the invention. Network-attached storage device for booting a remote computer.

BRIEF DESCRIPTION OF THE DRAWINGS

The features of this invention will be best understood from the following detailed drawings and the accompanying text.

DETAILED DESCRIPTION OF EMBODIMENTS OF THE INVENTION

In one aspect, the invention provides system, device, method, computer program and computer program product for a boot loader and boot device driver and associated structures and procedures that can send commands from the boot loader through the network controller (such as a NIC) to the networked storage device storing boot code or other command and/or data necessary to boot the requesting computer, and receive the necessary boot code or commands/data from the networked storage device (referred to here also as the boot device) over the network. In another aspect of the invention, the inventive boot driver that can access the networked remote boot device must be and is made available to the boot loader before it can initiate the booting procedures—that is, before it has been able to load the operating system which conventionally is where network device drivers are loaded. In another aspect, the invention stores the inventive boot loader on a medium accessible by the monitor program (such as the monitoring program or module that is part of the personal computer BIOS in PC compatible computer, such as a computer intended to operate in a Microsoft Windows operating system environment), such as CD, floppy diskette, external solid-state or flash memory, or the like, so that the monitor program may be configured to start the booting procedure by loading the boot loader of this invention.

In one aspect, the present invention provides system device, method, and computer program and computer program product that permits a computer in a networked environment to boot or bootstrap its operating system from a storage device that is not attached to its internal system bus but instead is attached directly to the network without any need to be coupled to the network through a server computer. In accordance with one aspect of the invention, the foregoing is achieved at least in part by providing a method for the boot loader program to access a directly attached bootstrapping device through the network and load the operating system onto the host computer from that location. It does not matter if the host computer and bootstrapping device are physically collocated or physically or geographically dispersed.

In another aspect, the invention provides and utilizes a boot loader software or firmware computer program that includes and uses an inventive new boot driver method and software in order to access the directly attached networked device. While the invention is most applicable and important relative to bootstrapping the computer, the method may also be applied to accessing other non-bootstrapping devices from the host computer.

In one aspect, the boot driver software is provides a novel network device driver methodology and software that sends and receives commands and files or data to and from the directly attached networked boot device over the network.

This invention also provides an alternative system, device, method, and computer program and computer program product that may access or otherwise use other types of storage devices than a directly attached networked storage device, such as a network-attached disk (NAD) or NETDISK® device made by XiMeta, Inc. of Irvine, Calif., that are directly attached to the network and can be accessible to the computer over the network as a bootstrapping device of the present invention. (NETDISK is a registered trademark of XiMeta, Inc., 15251 Alton Parkway, Irvine, Calif. 92618) Attributes of selected embodiments of NETDISK-type directly attached passive network storage devices such as a network-attached disk (NAD) are described in co-pending patent application Ser. No. 09/974,082 filed 9 Oct. 2001 entitled Disk System Adapted To Be Directly Attached To Network, and herein incorporated by reference in its entirety. Although such network-attached disk (NAD) or NETDISK-type directly attached passive network storage devices such as hard disk drives are well adapted to be used with and to cooperate with features of the instant invention, the instant invention is not limited to operate only with such NETDISK-type directly attached passive network storage devices.

One of the features of the invention is to provide one (or more generally a plurality of) device driver(s) so that any circuits, systems, or apparatus that is interposed between the computer and an external boot source can be communicated with by passing commands and data between the boot source storage device and the computer needing to boot. In the example presented in this description, the idea is to communicate with a network-attached disk (NAD), NETDISK type hard disk drive, or other network directly attached storage device. Therefore, in one embodiment, a network driver is provided by a monitor program or by a boot loader program so that that at least one of these programs can communicate over the network and find the source of the bootable operating system code. Where the communication link is to be different from a network, then the driver may be different than a network driver. In addition, even where the bootable code is located on some other (e.g. non-networked) communication link, a communication link device driver may be provided so that the booting can take place prior to loading the driver for that communication link from the operating system. The other feature of the invention is to provide a level of indirection so that a computer or other information appliance may be directed by either the monitor program or the boot loader as to where to acquire the bootable operating system code. This might is some embodiments be a device other than a network directly attached disk, NAD, or NETDISK-type directly attached storage device.

Unlike computer systems, devices, and methods that require the bootstrapping device to be coupled to an internal bus of the computer, either internally or via an externally exposed connection, the present invention does not require connection of the bootstrapping device, such as a bootstrapping hard disk drive device to be connected to an internal bus. Furthermore, unlike computer systems and methods that permit booting from or through a network boot server, the booting method and bootable storage device of the present invention that does not require participation of a separate server computer or server process executing on a computer in order to access or boot. In addition, the networked directly attached bootable storage device that contains the operating system for bootstrapping through the network becomes a local system storage device and may be a dedicated system storage device of the local computer system at the site.

Besides the difference in functionality, it will be apparent in light of the description provided herein that the inventive system, device, and method provide a high measure of portability associated with using a network directly attached boot device of the present invention rather than a network boot server. Note also that the booting devices of the present invention are networked devices and they can be accessed dynamically over the network.

In order for a computer to have a storage device, such as hard disk drive device, containing its operating system that is separate and detached from the host computer internal bus but attached instead to the network, the computer system should be able to bootstrap its operating system from the storage device through the network. Note that this ability to access the network and a device or subsystem directly attached to the network arises at the same time or before the operating system is loaded and at a time where network drivers or other infrastructure normally provided by a loaded operating system are not available because the operating system is not yet present on the host computer. One advantage of the instant invention is therefore to provide a system, method, device, and computer program and computer program product in which a host computer or other information appliance boots, bootstrap, or otherwise accesses and loads its operating system from a device that is not attached to its own inside bus, or to the network via a separate server, but instead is directly attached to the network. Such directly attached network device may, for example be a NETDISK® device from XiMeta, Inc. of Irvine, Calif. that is described in co-pending patent application Ser. No. 09/974,082 filed 9 Oct. 2001, published as U.S. 20020069245 and entitled Disk System Adapted To Be Directly Attached To Network; which application is hereby incorporated by reference.

As described in application Ser. No. 09/974,082, an embodiment of network-attached disk (NAD) system includes an NAD device for receiving a disk access command from a host computer through a network, and a device driver at the host for controlling the NAD device through the network, where the device driver may create a virtual host bus adapter so that the host recognizes the NAD device as if it is a local device to the host. The NAD device itself may include a disk or other storage means for storing data, a disk or other storage media controller for controlling the disk or other storage media, and a network adapter for receiving a disk or other storage device access commands from the host through a network port.

The bootstrapping from the remote devices directly attached to the network has numerous advantages over conventional bootstrapping devices, systems, and methods. Several of these advantages are now described.

First, it may provide better accessibility to the computer system. Because the system disks of each users are separate from the input/output devices of the computer but readily available through the network, a user can log into or otherwise access his/her own computer system using any set of input/output devices available to him/her at the site over the network.

Secondly, it may provide quieter and more pleasant desk top environment because the system hard disk of this invention can be located in a remote room or location for more desk top space and for less heat and noise production.

Thirdly, it may provide better controlled accesses to the computer system enhancing security. The monitoring method and monitor program of the instant invention may readily check the authenticity of a user or users accessing or attempting to access a system hard disk through the network, and it may be set to allow only authenticated users to gain access to a specified system hard disk or portions thereof.

Finally, the invention provides a new paradigm for computer portability. Rather than a user carrying the whole notebook, the user may carry only the present invention's system hard disk that is a network directly attachable storage device that has operating system and data on it. At the remote site, the user may simply plug a wired storage device operating as the system disk to the network at the site in order to get whole computer system. Where a wireless connection capability is provided to the network, no plugging is required, and portability is further enhances. It is not necessary that the user physically carry a keyboard and mouser or other pointing device, display screen, and other input/output devices altogether to the remote site. The user may simply use such devices that are available at the remote site. This way of carrying system disk is fundamentally different from carrying a part of user data on diskette, flash memory stick, or CD, because sometimes the user will want to carry not only a particular data file or set of data files, but also a whole computer system with an operating system and various application software programs configured appropriately. The network directly attached device need not be a hard disk drive device but may instead by any device that can be directly attached to the network and store the operating system and optionally any other software and/or data.

Figure 6:
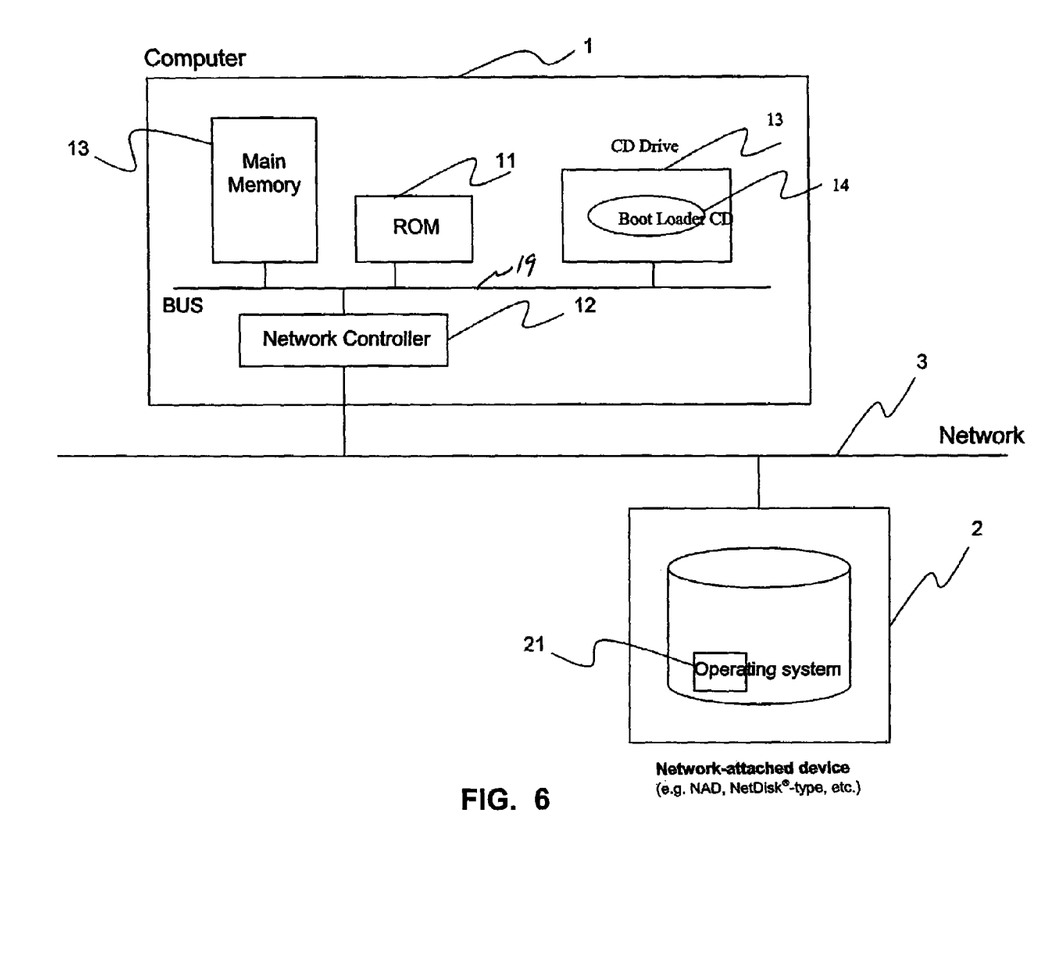
FIG. 6 is an illustration showing an exemplary schematic diagram of an embodiment of the present invention where a computer bootstraps its operating system from a directly attached networked boot device instead of from an internal storage device.

FIG. 6 shows the schematic diagram of an embodiment of the present invention. The computer or other information appliance 1 in the embodiment of FIG. 6 has its operating system software in a storage device 2 that is directly attached to a network, such as a directly attached network hard disk drive storage device, instead of its internal bus coupled hard disk drive storage device. The monitor program in ROM 11 of the computer 1 reads in the boot loader code 14 in the boot loader CD (or other storage) of CD drive 13, and the boot loader 14, in turn, loads the operating system 21 from the external directly attached network 3 storage device 2, that is connected through the network 3. The networked storage device may for example be a NETDISK® directly attached network hard disk drive device, but is not limited to such devices.

It will be appreciated that once the monitor program in ROM 11 reads the inventive boot loader code 14 from the boot loader CD 13, the inventive boot loader code 14 may be stored in the ROM (such as a update to the ROM or ROM-based BIOS) so that the CD 13 is not required for subsequent boot-strapping of the same computer unless the content of the ROM is erased. The boot loader 14 would be required for different computers. Advantageously, the inventive boot loader would be incorporated into the monitor programs at the time of manufacture or loading so that the computer or other information appliance may boot from a network directly attached device without subsequent modification. Furthermore, if the modified boot loader is already present on a computer, from whatever source and can be stored to the ROM as a change or update, the CD 14 or other media may not be required.

Notice that in this embodiment of the invention, the device that contains the operating system is attached to the network 3, not to the inside system bus 19 of the computer 1. Furthermore, the networked device is directly attached to the network and does not require or utilize remote network server connectivity or support to access the network directly attached storage.

Figure 7:
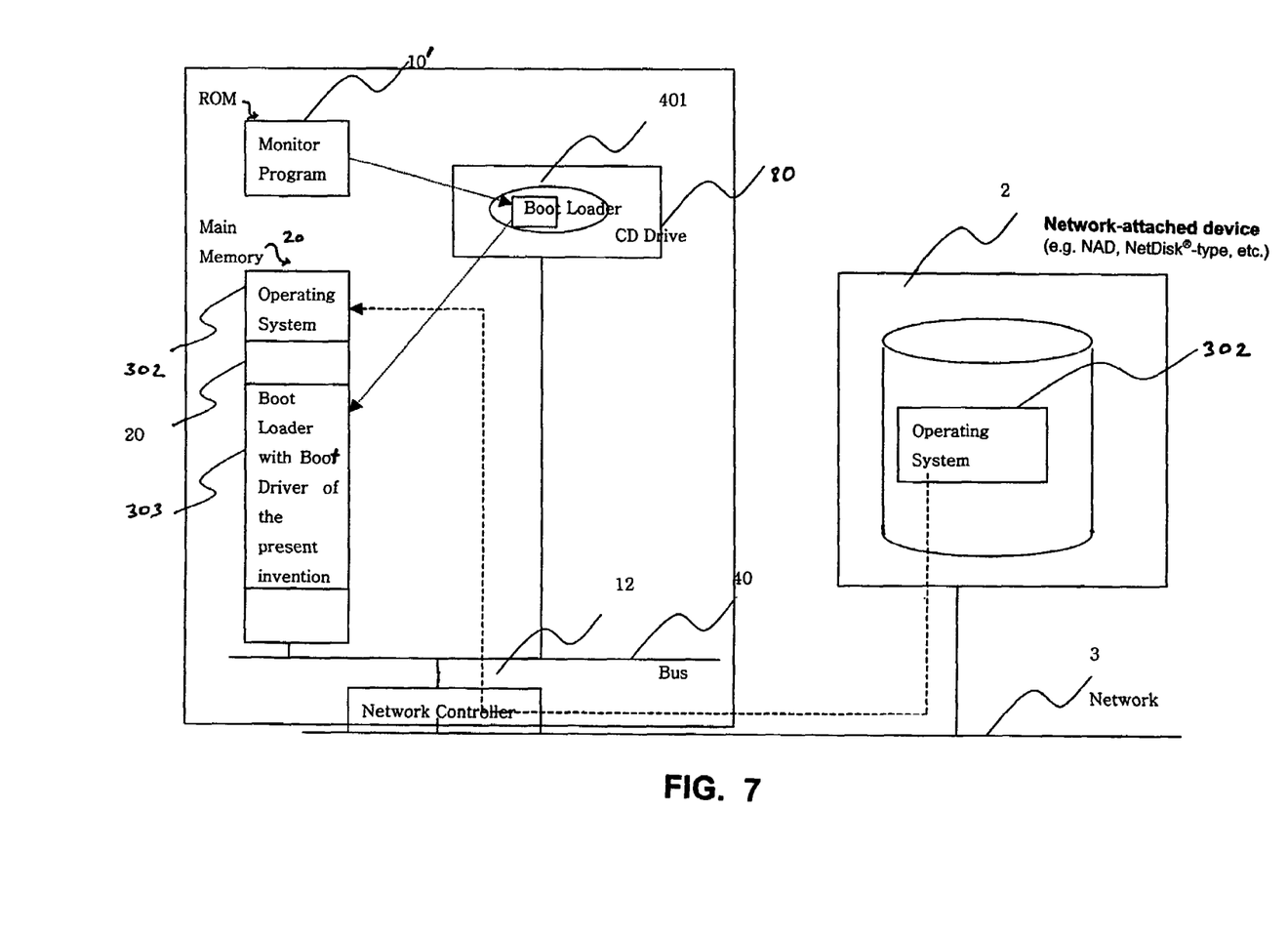
FIG. 7 is an illustration showing an embodiment of the inventive directly attached storage device bootstrapping procedure from a CD-ROM/RAM device storing a network boot loader that causes the boot loader and a boot driver for a network device to be loaded into computer memory.

In the embodiment of FIG. 7, a CD disk mounted in a CD drive 13 is identified as the storage media as an example of a boot-initiating device from which the monitor program can start the bootstrapping procedure. Other devices that can be used as boot-initiating devices may include any one or combination of (but are not limited to) floppy diskette, external flash memory stick or card, compact flash, and/or other types of drives that the original monitor program is prescribed or may be modified to prescribe or identify to be able to initiate the bootstrapping.

Notice that although the overall procedure may be somewhat similar to the conventional booting procedure described in FIG. 1, it has major differences. One significant difference, is that the monitor program reads in the inventive boot loader from a medium that is connected to the internal bus of the system and the inventive boot loader (once loaded) reads in the operating system that is stored in a remote boot device that is directly attached to the network using the boot driver software of this invention.

Figure 8:
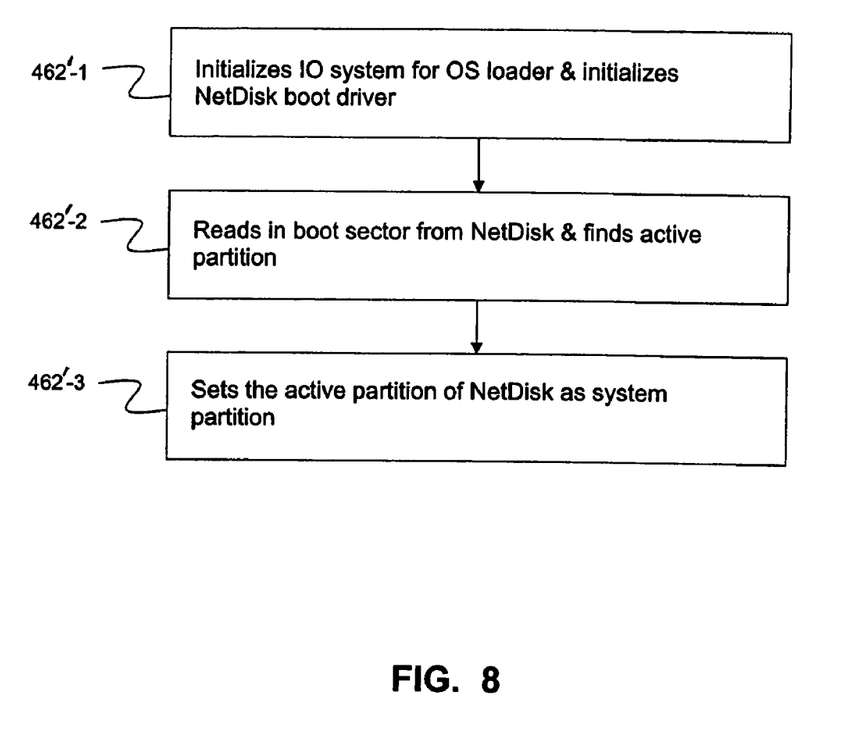
FIG. 8 is an illustration showing an exemplary of a flow diagram of the processes of the system boot loader according to an embodiment of the present invention.

FIG. 8 is a schematic illustration showing exemplary steps according to one exemplary embodiment of an operating system booting procedure for a computer when the boot loader of the present invention is stored on a CD. Note that the CD on which the boot loader is stored does not store the operating system, and even if the CD were to contain an operating system code (or any other files), the operating system on the CD is not used for booting.

In a first step (Step 1), the inventive monitor program 10' stored in the ROM reads the boot loader 401 of the boot CD from CD drive 80 into the main memory 20 of the computer, loading the boot loader at a specified location (address range) of the main memory 201. Next (Step 2), the monitor program 10' transfers control to the boot loader program 401 that was read in from the boot block in the first step (Step 1). Third (Step 3), the boot block loader program with boot driver 303 finds and loads the operating system blocks 302 from specified location (or by search) in the directly attached network storage device 2 (such as a NETDISK® directly attached network storage device) into the specified main memory location 202. The boot loader with boot driver 303 uses the boot driver through which it can access the remote storage device 2 over the network 3. Fourth (Step 4), loading of the operating system 22 from the network device 2 into the main memory 20 is completed, and the boot block loader program 201 transfers control to the operating system 202 (now loaded into memory of the computer) in order to start running the computer system under operating system control.

It will be appreciated that conventional aspects of the computer system and associated conventional procedures are not described in great detail to avoid obscuring features and advantages of the invention. For example, it will be understood that the computers include processors, microprocessors, or central processing units that are associated with the main memory 20 that can execute instructions and operate on data that results in the operation described. Internal bus structure and details for coupling devices to internal buses are also known and not described in great detail here.

Notice that the boot loader of this invention, as compared to the approach illustrated relative to FIG. 1 that stores its conventional boot loader on either an internal bus coupled storage medium or on a network storage device through a separate server computer and is server application and operating system, may instead be stored in other medium as long as the monitor program can be directed as described relative to embodiments of the invention to access that medium that the boot loader of this invention is stored to start the booting procedures.

With reference to the FIG. 1 system, it is noted that the conventional monitor program 10 reads a boot loader block 301 on internal bus coupled hard disk drive 30 and causes the boot loader block 301 to be copied to a portion of main memory 20 as boot loader 201. Boot loader then causes operating system 302 also stored on the internal bus coupled hard disk drive 30 to be copied to a different portion of main computer memory 20. Operating system 202, once resident in main memory 20 of the booted computer is able to take control, and execute application programs or participate in other activities as are known in the art.

By way of partial comparison relative to the FIG. 6 and FIG. 7 embodiments of the invention, the inventive monitor program 10' reads an inventive boot loader block 401 on storage device 80 (that may be but need not be internal bus coupled) and causes the boot loader block 401 to be copied to a portion of main memory 20 as boot loader 201. Boot loader then causes operating system 302 stored on a network directly attached device 2 different from the internal bus coupled hard disk drive 30 (if present). CD drive 80, or other storage device from which the boot loader program 401 was stored and read, to be copied to a different portion of main computer memory 201. Operating system 202 (which in principle may be identical to the operating system obtained from an internal bus coupled storage device, once resident in main memory 20 of the booted computer is able to take control, and execute application programs or participate in other activities as are known in the art, just as for the embodiment in FIG. 1. It is noted that once resident in memory 20, the operating system may be copied to an internal storage device, such as to an internal bus coupled hard disk drive, but this is not required and depending upon operating environment, security, user preferences, or other factors or concerns may be advantageous or disadvantageous. It will be apparent that at certain points in time, the data structure and contents in main memory will be different relative to the invention and to a typical conventional computer at least in that the invention provides for a portion of main computer memory 20 to store both the inventive boot loader and the inventive boot driver that permits connectivity from the computer over the network through the network controller 12 to the network directly attached disk, even before the operating system 202 that would normally provide such network connectivity has been loaded or be available. The memory structure of the conventional system does not provide such network connectivity until after the operating system (or a portion thereof) has been loaded.

It will be appreciated that in conventional systems, devices, and methods when booting from or with the aid of a boot server over the network, a standard boot protocol (usually, TFTP and sometimes FTP) and corresponding standard boot drivers are installed inside the NIC hardware as a form of NIC BIOS. This is not the same as boot drivers in the system BIOS of a computer. The system BIOS uses simple commands (such as for example, an INT command) to permit and facilitate a NIC BIOS to transfer boot files from the boot server using, for example, using TFTP protocol.

It will be apparent in light of the description provided here, that one aspect of the invention facilitates the bootstrapping the computer or other information appliance or system from a networked booting device, such as a NAD or NETDISK® device, by replacing the conventional boot driver accessing the conventional boot devices with the boot driver that accesses such networked boot device.

The invention also provides an inventive boot loader installed with inventive boot device driver software and uses a separate medium or media to store the boot loader such that the original monitor program accesses the boot loader of the invention.

Embodiments of the invention may utilize boot loaders that are different from and specifically adapted to provide communication with particular device types. However, embodiments of the invention may also or alternatively utilize a boot loader that is the same or substantially the same as in pertinent part to a conventional loader such as the "ntldr" loader if the Microsoft Windows operating system is to be the operating system of the computer for which booting is desired, except that the boot loader of the invention uses boot device driver software that can access the directly attached network devices over the network instead of boot devices connected to the internal bus of the computer to be booted.

Notice that one of the differences between the conventional bootstrapping and the bootstrapping of the present invention is the different respective boot device types that they bootstrap their operating systems from. The conventional bootstrapping system and method uses a conventional boot device such as internal hard disk drive installed in the computer and coupled to the computer system bus, while the bootstrapping system and method of the present invention uses a boot device (such as a NETDISK®-type directly attached passive network hard disk drive storage device) that is directly attached to the network but is physically separate from the system bus of the computer. Therefore, in one aspect the inventive system and method provides a boot loader having a different boot driver software than conventional boot driver. More particularly, the inventive boot loader of the present invention provides a boot driver through which the boot loader of the present invention accesses a booting device that is not attached to the system bus or other internal bus but instead is directly attached to the network. This direct network connection, is different from a server mediated or controlled connection to a storage device that also happens to be on the network.

In conventional bootstrapping, the boot loader is usually stored on the same boot device the operating system is stored. Notice, however, that the boot loader itself does not have to be stored in the boot device from which the system is bootstrapping. Instead, the boot loader can be stored on other medium such as floppy diskette, CD, or flash memory stick that is not the actual boot device. This is important if we prefer not to change the monitor program of the computer system but want to use the same monitor program to bootstrap the computer system from a boot device such as a directly attached passive network storage devices that the original monitor program is not aware of a priori or in advance of the attempt to boot.

In at least one embodiment of the present invention, the boot loader of the present invention that is subsequently installed with the boot driver software of the present invention is stored on a storage medium that the original monitor program can bootstrap the system from. The monitor program is then configured to bootstrap the system from a known medium on which the boot loader of the present invention is stored. The storage medium may be any storage medium, such as but not limited to CD, DVD, floppy diskette, solid state memory, compact flash card, flash memory stick or other memory storage device or system. Notice that it is known to provide a monitoring or startup program that have a series of pre-specified facilities or lists that identify possible prioritized boot devices such as floppy drive, CD drive, or external flash memory stick from which the monitor programs start the bootstrapping. This has been provided at least in part so that in the event that a boot device that has failed or been corrupted may be preempted by a floppy disk or CD having some known good software that may be used for recovery, repair, or reloading of system software.

Therefore, the bootstrapping of the present invention differs from the conventional bootstrapping at least in the procedures where boot driver is invoked for loading the operating system as well as in other ways. The present invention replaces the conventional boot driver such as SCSI boot driver as shown in 462 of FIG. 4 with the corresponding boot driver for networked boot device. For example, the boot loader may still initializes video system (such as for debugging) and initialize paging mode 461, although these may in a sense be considered as optional and peripheral to the central theme of the invention. It then initializes the input/output (I/O) system and the operating system boot driver software needed for actual operating system loading 462, but the details of how this is accomplished are changed and described in greater detail relative to FIG. 8.

In one embodiment described in greater detail herein elsewhere, these alternative steps provide for initializing the input/output system for the operating system loader including the boot driver for the network directly attached storage device for the operating system loading 462'-1, reading in the boot sector from the network directly attached device 2 and finding the active partition 462'-2 (when partitions are used), and setting the active partition of the network directly attached device 2 as the system partition 462'-3.

Once the system is initialized, the system operates in conventional manner. For example, the loader reads in any file tables that may be required, possibly including any mini file systems that may be required for the boot loader 463, and may perform any one or a series of system initializations according to the hardware profile and configuration recovery file 464 as may be required; and loads all the DLL's, kernel images, registry database, and device drivers respectively 465, 466, 467 in more or less conventional manner before it completes the loading of its operating system software 468.

It will be appreciated that external storage device with USB, IEEE 1394, or other interface may be used as a booting device. However, one of the fundamental difference between the booting device of the present invention and other conventional external storage based booting devices and methods is that the conventional external storage devices are either not networked (or are networked only indirectly through a separate autonomous boot server system that has a full scale file system, operating system, CPU or processor, memory such as RAM or DRAM), but the booting devices and methods of the present invention involve booting from directly and passively networked that can be accessed dynamically over the network.

FIG. 8 shows the detailed bootstrapping steps of the present invention that are replacing the step 462 of FIG. 4 when a directly attached passive network storage device is used as a boot device. In the FIG. 8 embodiment, the system boot loader of the present invention initializes input/output system for the operating system loader including the boot driver for the directly attached passive network storage device for the operating system loading 462'-1. Then, it reads in the boot sector from the directly attached passive network storage device and finds the active partition 462'-2, and sets the active partition of the device as the system partition 462'-3. These procedures of resetting the system partition are required if the active partition of the storage device was not the active partition of the computer system originally. The boot driver of the present invention is a network device driver software that sends and receives the data accessing commands and data to and from the networked device respectively.

So far, we took the case where the monitor program loads the boot loader from a separate medium than the directly attached passive network storage device on which actual operating system is stored for the simplicity of the explanation. However, notice that the boot loader program can be stored in the networked boot device, such as a NETDISK® device, if the monitor program or BIOS is provided with the appropriate procedures and the boot device driver that can access the directly attached passive network storage device over the network.

Figure 9:
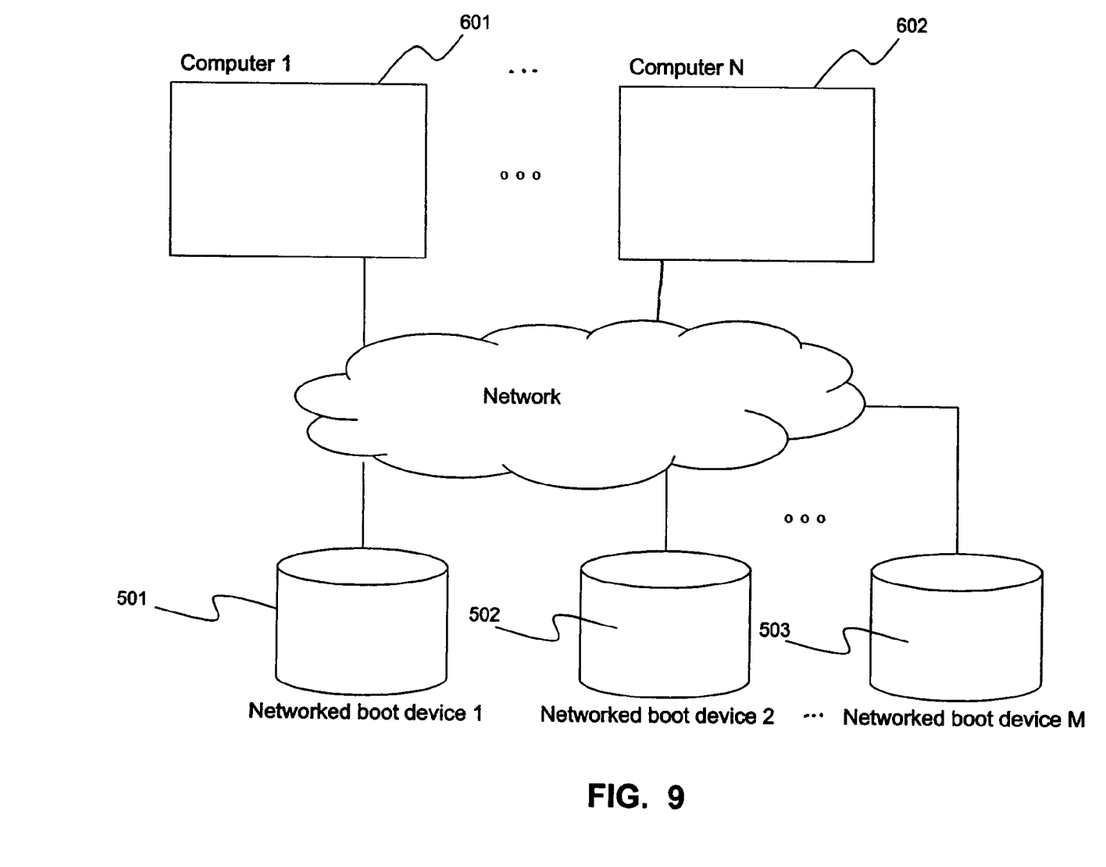
FIG. 9 is an illustration showing an exemplary embodiment of a network where computers bootstrap from the networked boot devices according to an embodiment of the invention.

The booting method of the present invention provides the computer users with the freedom of mobility. FIG. 9 illustrates a network environment where multitude of networked boot devices such as NAD or NETDISK® devices or other directly attached passive network storage devices 501, 502, 503 is attached to the network of multitude of computers 601, 602. Users can log in to his/her system that resides in one of the networked boot devices 501, 502, 503 using any computer 601, 602 over the network. At the same time, more than one computer can bootstrap their system from a single networked boot device. Besides the convenience of booting, the bootstrapping from the remote devices directly attached to the network in this invention provides additional advantage over the conventional booting such as access control mechanism by enforcing users to use a specific loading device. For example, the loader program in the present invention can be stored in a portable storage device or media. If it is the case, users only with the memory stick installed with proper loader program can get accesses to the computer systems. Additional access control measures can be realized if authentication procedures are added to the loader program.

Certain embodiments of the invention have been described with emphasis on hard disk drives incorporating the NAD or NETDISK® directly attached hard disk drive device or other directly attached passive network storage device as a primary bootstrapping device; however, it will be appreciated in light of the description provided here that the same or analogous method and procedures described may be applied to any other types of boot devices as long as the bootstrapping devices are directly attachable to the network. For example, if a CD drive is directly attached to the network and accessible to the computer through the network, any computer on the network can bootstrap the operating system from the boot CD the same way it bootstraps from the directly attached passive network storage device as shown and described relative to the instant invention.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of booting a computer with an operating system from a directly attached network storage device, the method comprising:
   executing a monitor program in a processor and memory of the computer to be booted that: (i) reads a boot block loader program from a locally accessible storage device and writes the boot loader program to a first location in a processor accessible memory of the computer; and (ii) transfers control from the monitor program to the boot block loader program; and
   executing the boot block loader program in the processor and memory of the computer to be booted that:
   (iii) loads a boot driver program code that includes a network interface driver program code for accessing the directly attached network storage device on which the operating system is stored over a network;
   (iv) finds the operating system to be booted in the directly attached network storage device;
   (v) loads the operating system from the directly attached network storage device over the network using the network interface driver to a second location in a processor accessible memory of the computer; and
   (vi) transfers control from the boot block loader program to the operating system in memory,
   wherein the directly attached network storage device is not attached to the network through a network server computer having a processor, operating system, and server process executing therein.

2. A method of booting a computer as in claim 1, further comprising operating the computer under control of the operating system after the operating system is loaded from the directly attached network storage device.

3. A method of booting a computer as in claim 1, wherein the boot loader program comprising a plurality of computer program code instructions.

4. A method of booting a computer as in claim 1, wherein the memory of the computer to be booted comprises the main system random access memory of the computer to be booted.

5. A method of booting a computer as in claim 1, wherein the operating system to be booted comprises a plurality of boot code blocks.

6. A method of booting a computer as in claim 1, wherein the operating system to be booted is identified to be at a predetermined specified location of the network.

7. A method of booting a computer as in claim 1, wherein the operating system to be booted is identified at a location by actively searching available network devices.

8. A method of booting a computer as in claim 1, wherein the operating system to be booted is identified at a location by passively listening to the network for available network devices storing operating systems for use in booting the computer.

9. A method of booting a computer as in claim 1, wherein the directly attached network storage device is not attached to an internal bus within the housing of the computer.

10. A method of booting a computer as in claim 1, wherein the directly attached network storage device comprises a NETDISK hard disk drive type directly attached network storage device.

11. A method of booting a computer as in claim 1, wherein the monitor program includes program instruction and data means for checking the authenticity of a user accessing the directly attached network storage device over the network.

12. A method of booting a computer as in claim 1, wherein the monitoring program further includes program instruction and data means to allow only authenticated users to obtain an access to a specified directly attached network storage device over the network.

13. A method of booting a computer as in claim 1, wherein the method further comprises loading at least one of an application program, at least one user data, a user suite of application programs and data, a user customized suite of application programs.

14. A method of booting a computer as in claim 13, wherein the application program(s) and/or user data are loaded with the operating system.

15. A method of booting a computer as in claim 1, wherein the computer is a diskless computer not having a hard disk drive or other non-volatile mass storage device capable of non-volatile storage of the operating system to be loaded and booted.

16. A method of booting a computer as in claim 1, wherein the computer includes an internal storage device but the internal storage device does not contain the operating system software from which the computer boots to an operational state.

17. A method of booting a computer as in claim 1, wherein the computer includes an internal storage device containing an operating system software from which the computer could boot to an operational state, but the monitor program is adapted so as to preferentially boot from the directly attached network storage device over the network.

18. A method of booting a computer as in claim 1, wherein the memory storing the monitor program is a read-only memory (ROM) within the housing of the computer or a local memory physically coupled to an input/output port or a bus of the computer.

19. A method of booting a computer as in claim 1, wherein the directly attached network storage device is physically collocated with the computer to be booted and both the computer to be booted and the directly attached network storage device are connected to the same network.

20. A method of booting a computer as in claim 19, wherein the network is selected from the set of networks consisting of the Internet, an intranet, a home network, a wired network, a wireless network, a local area network, a wide area network, a cable network, and any combination of two or more of these networks.

21. A method of booting a computer as in claim 19, wherein the storage device on which the system boot loader is stored is selected from the set of devices consisting of a CD, a flash memory stick, a flash memory, a compact flash card memory, a USB memory, a floppy diskette, or any other memory or storage device locally accessible to the computer to be booted.

22. A method of booting a computer as in claim 1, wherein storage device may be provided by a device selected from the group of devices consisting of a CD, a DVD, a semiconductor memory, memory card, a compact flash memory, a memory stick, an optical storage device, a floppy diskette, a mobile telephone having a memory, a USB memory device, a personal data assistant (PDA), an MP3 audio player, an Apple Computer iPOD™, a digital or electronic camera, any device having a memory storage for storing a component of an operating system software code, and any combination of two or more of these.

23. A method of booting a computer as in claim 1, wherein the boot driver comprises is a network device driver software that: (i) sends data accessing commands and/or files or data to the networked device, and/or (ii) receives data accessing commands and/or files or data from the networked device.

24. A method of booting a computer as in claim 1, wherein the monitor program reads and loads the boot loader program stored on other than the directly attached network storage device and then loads the operating system from the directly attached network storage device.

25. A method of booting a computer as in claim 1, wherein the monitor program includes program instruction and data means that permits the monitor program to access the directly attached network storage device; and, the monitor program reads and loads the boot loader program stored on a directly attached network storage device and then loads the operating system from the directly attached network storage device.

26. A method of booting a computer as in claim 25, wherein the monitor program includes program instruction and data means that permits the monitor program to access the directly attached network storage device.

27. A method of booting a computer as in claim 1, wherein the network includes a plurality of directly attached network storage devices coupled to the network and certain of coupled directly attached network storage devices are hidden by a security procedure to a particular user or set of users so that the user or set of users cannot select or boot from the hidden devices.

28. A method of booting a computer as in claim 1, wherein the method further includes an access control procedure in which particular access may be granted or denied based on access privileges and security authentication procedures incorporated into or interfaced with monitor program, the boot loader program, or a combination of the monitor program and the boot loader program.

29. A method of booting a computer as in claim 1, wherein a plurality of computers may concurrently access and boot from a single directly attached network storage device.

30. A method of booting a computer as in claim 1, wherein the directly attached network storage device is a NAD.

31. A method of booting a computer as in claim 1, wherein the monitor program is initially stored in a read-only memory (ROM) of the computer to be booted.

32. A method of booting a computer with an operating system from a directly attached network storage device, the method comprising:
   executing a boot block loader program in a processor and memory of the computer to be booted that before loading an operating system, loads a device driver for accessing the directly attached network storage device on which an operating system for the computer is stored;
   loading the operating system from the directly attached network storage device that is not directly coupled to an internal local bus of the computer using the device driver, to processor accessible memory; and booting the computer from the loaded operating system; wherein the device driver includes a network interface driver program code for accessing the directly attached network storage device on which the operating system is stored over a network and further wherein the directly attached network storage device is not attached to the network through a network server computer having a processor, operating system, and server process executing therein.

33. A method of booting a computer as in claim 32, further comprising reading the boot loader program from a locally accessible storage device and loading the boot loader program to a processor accessible memory of the computer.

34. A method of booting a computer as in claim 32, wherein the storage device that is not directly coupled to an internal local bus of the computer may be any single or plurality of storage devices capable of storing the operating system in any form or format.

35. A computer program product for use in conjunction with a computer system, the computer program product comprising a computer readable storage medium and a computer program mechanism embedded therein, the computer program mechanism, comprising:

a program module that directs the computer, to boot a computer with an operating system from a directly attached network storage device, the program module including instructions for:

executing a monitor program in a processor and memory of the computer to be booted that: (i) reads a boot block loader program from a locally accessible storage device and writes the boot loader program to a first location in a processor accessible memory of the computer; and (ii) transfers control from the monitor program to the boot block loader program; and executing the boot block loader program in the processor and memory of the computer to be booted that:

(iii) loads a boot driver program code that includes a network interface driver program code for accessing the directly attached network storage device on which the operating system is stored over a network;

(iv) finds the operating system to be booted in the directly attached network storage device;

(v) loads the operating system from the directly attached network storage device over the network using the network interface driver to a second location in the processor accessible memory of the computer; and (vi) transfers control from the boot block loader program to the operating system in memory, wherein the directly attached network storage device is not attached to the network through a network server computer having a processor, operating system, and server process executing therein.

36. A computer comprising:

a processor and a random access memory coupled to the processor; and a non-volatile storage device storing at least one program, the at least one program controlling operation of a boot loader and boot device driver so that the computer can: (a) send commands and/or data through a network controller to a directly attached network boot device that stores additional boot or operating system code, and (b) receive additional boot code or commands and/or data from the boot device over a network;

wherein the boot device driver includes a network interface driver program code for accessing the directly attached network boot device on which the operating system is stored over the network and further wherein the directly attached network boot device is not attached to the network through a network server computer having a processor, operating system, and server process executing therein.

37. A computer as in claim 36, wherein the boot device comprises a network-attached device.

38. A computer as in claim 36, wherein the computer does not include a non-volatile storage device larger than 4 gigabytes.

* * * * *